US011983627B2

(12) United States Patent
Huang (10) Patent No.: US 11,983,627 B2
(45) Date of Patent: May 14, 2024

(54) DEEP LEARNING BASED VISUAL SIMULTANEOUS LOCALIZATION AND MAPPING

(71) Applicant: Black Sesame International Holding Limited, San Jose, CA (US)

(72) Inventor: Yu Huang, Sunnyvale, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 365 days.

(21) Appl. No.: 17/313,758

(22) Filed: May 6, 2021

(65) Prior Publication Data

US 2022/0358359 A1  Nov. 10, 2022

(51) Int. Cl.
| | |
|---|---|
| *G06N 3/08* | (2023.01) |
| *G06N 3/045* | (2023.01) |
| *G06T 7/11* | (2017.01) |
| *G06T 7/50* | (2017.01) |
| *G06T 7/73* | (2017.01) |

(52) U.S. Cl.
CPC ............... *G06N 3/08* (2013.01); *G06N 3/045* (2023.01); *G06T 7/11* (2017.01); *G06T 7/50* (2017.01); *G06T 7/75* (2017.01); *G06T 2207/20081* (2013.01); *G06T 2207/20084* (2013.01)

(58) Field of Classification Search
CPC ........ G06N 3/08; G06N 3/045; G06N 3/0442; G06N 3/0455; G06N 3/0464; G06T 7/11; G06T 7/50; G06T 7/75; G06T 2207/20081; G06T 2207/20084; G06V 10/82
See application file for complete search history.

(56) References Cited

U.S. PATENT DOCUMENTS

| | | | |
|---|---|---|---|
| 2021/0042937 A1* | 2/2021 | Ji | G06T 7/246 |
| 2021/0049371 A1* | 2/2021 | Gu | G06N 3/088 |
| 2021/0350150 A1* | 11/2021 | An | G06N 3/045 |

(Continued)

OTHER PUBLICATIONS

Yin, Z, Shi, J "GeoNet: Unsupervised Learning of Dense Depth, Optical Flow andCamera Pose", CVPR 2018. arXiv:1803.02276v2 (Year: 2018).*

(Continued)

*Primary Examiner* — Nancy Bitar
*Assistant Examiner* — Dustin Bilodeau
(74) *Attorney, Agent, or Firm* — Timothy T. Wang; Ni, Wang & Massand, PLLC (57) ABSTRACT

A joint training network including a multi-heard module comprising a network input, a feature network coupled to the network input and including a feature detector decoder outputting interest points and a descriptor generator decoder outputting descriptors, the feature detector decoder and the descriptor generator decoder coupled in parallel, a depth network including a monocular depth prediction decoder and outputting a depth map, a flow network including an image segmentation decoder and outputting a segmented image, a segmentation network including a warping module outputting a rotation and translation and an input warp signal to a segmentation decoder outputting a residual flow and a pose network including a fully connected pose estimator coupled to an adder that receives input from the pose estimator and the residual flow from the segmentation decoder, the adder outputting an optical flow.

13 Claims, 8 Drawing Sheets

(56) References Cited

U.S. PATENT DOCUMENTS

2021/0383553 A1* 12/2021 Guizilini ............ G01C 21/3407
2022/0114750 A1*  4/2022 Sun ..................... G06V 10/757

OTHER PUBLICATIONS

Ranjian et al., "Competitive Collaboration: Joint Unsupervised Learning ofDepth, Camera Motion, Optical Flow and Motion Segmentation", CVPR, 2019 arXiv:1805.09806v3 (Year: 2019).*
Z Yin, J Shi, "GeoNet: Unsupervised Learning of Dense Depth, Optical Flow and Camera Pose", CVPR 2018.
Y Zuo, Z Luo, J Huang, "DF-Net: Unsupervised Joint Learning of Depth and Flow using Cross-Task Consistency", ECCV, 2018.
E Parisotto et al. "Global pose estimation with an attention-based recurrent network", arXiv: 1802.06857, 2018.
Y Kim, A Kim, "Sequential Learning of Visual Tracking and Mapping Using Unsupervised Deep Neural Networks", arXiv: 1902.09826, 2019.
U Kim, S Kim, J Kim, "SimVODIS: Simultaneous Visual Odometry, Object Detection, and Instance Segmentation", arXiv:1911.05939, 2019.
A Ranjian et al., "Competitive Collaboration: Joint Unsupervised Learning of Depth, Camera Motion, Optical Flow and Motion Segmentation", CVPR, 2019.
F Xue et al., "Beyond Tracking: Selecting Memory and Refining Poses for Deep Visual Odometry", IEEE CVPR 2019.
T Shen et al., "Self-Supervised Learning of Depth and Motion Under Photometric Inconsistency", ICCV Workshops, 2019.
Y Shi et al., "Self-Supervised Learning of Depth and Ego-motion with Differentiable Bundle Adjustment", arXiv: 1909.13163, 2019.

* cited by examiner

DEEP LEARNING BASED VISUAL SIMULTANEOUS LOCALIZATION AND MAPPING

BACKGROUND

Technical Field

The instant disclosure is related to autonomous driving and more specifically to deep learning based visual localization and mapping.

Background

Current visual simultaneous localization and mapping (VSLAM) methods are hampered by the ill-posed problem of 3D reconstruction from 2D images.

SUMMARY

An example joint training network includes a multi-head module includes a network input, a feature network coupled to the network input and including a feature detector decoder outputting interest points and a descriptor generator decoder outputting descriptors, the feature detector decoder and the descriptor generator decoder coupled in parallel, a depth network coupled to the network input and including: a monocular depth prediction decoder and outputting a depth map, a flow network coupled to the network input and including an image segmentation decoder and outputting a segmented image, a segmentation network coupled to the network input and including a warping module outputting a rotation and translation and an input warp signal to a segmentation decoder outputting a residual flow and a pose network coupled to the network input and including a fully connected pose estimator coupled to an adder that receives input from the pose estimator and the residual flow from the segmentation decoder, the adder outputting an optical flow.

DETAILED DESCRIPTION OF THE INVENTION

The embodiments listed below are written only, to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

Figure 1:
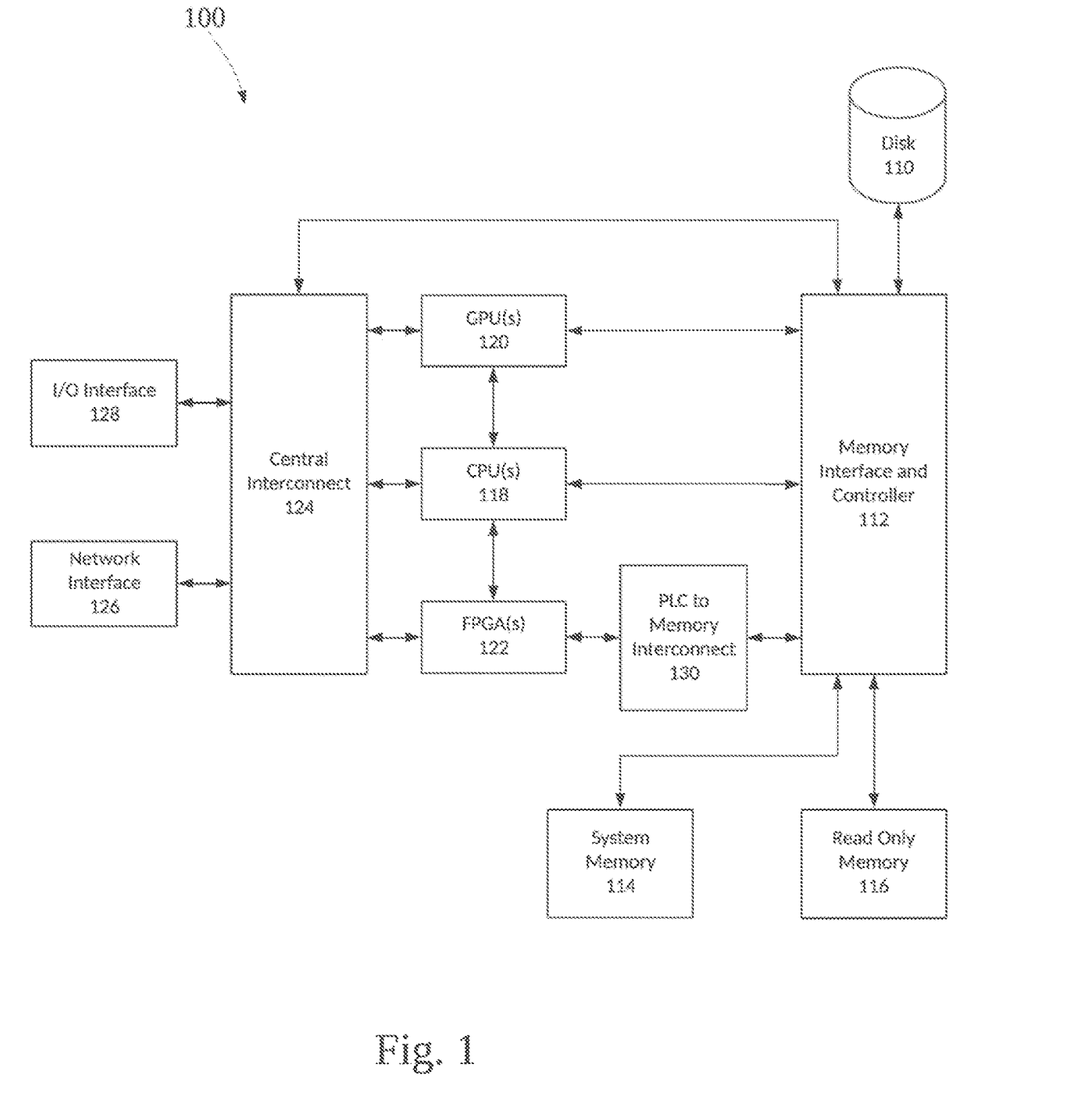
FIG. 1 is a first example system diagram in accordance with one embodiment of the disclosure.

In the following discussion and in the claims, the terms "including" and "comprising" are used in an open-ended fashion, and thus may be interpreted to mean "including, but not limited to . . . " Also, the term "couple" or "couples" is intended to mean either an indirect or direct connection. Thus, if a first device couples to a second device that connection may be through a direct connection or through an indirect connection via other devices and connections, FIG. 1 depicts an example hybrid computational system 100 that may be used to implement neural nets associated with the operation of one or more portions or steps of the processes. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality, leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU, Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC' is on the order of quarters of a year, not the quick turn-around implementation that is available in programming an FPGA The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory, disk 110, system memory 114 and read only memory (ROM) 116.

The system of FIG. 1A may be utilized for programming and training the FPGA. The GPU functions well with unstructured data and may be utilized far training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect. 124 is additionally connected to the input and output interface 128 and the network interface 126.

Figure 2:
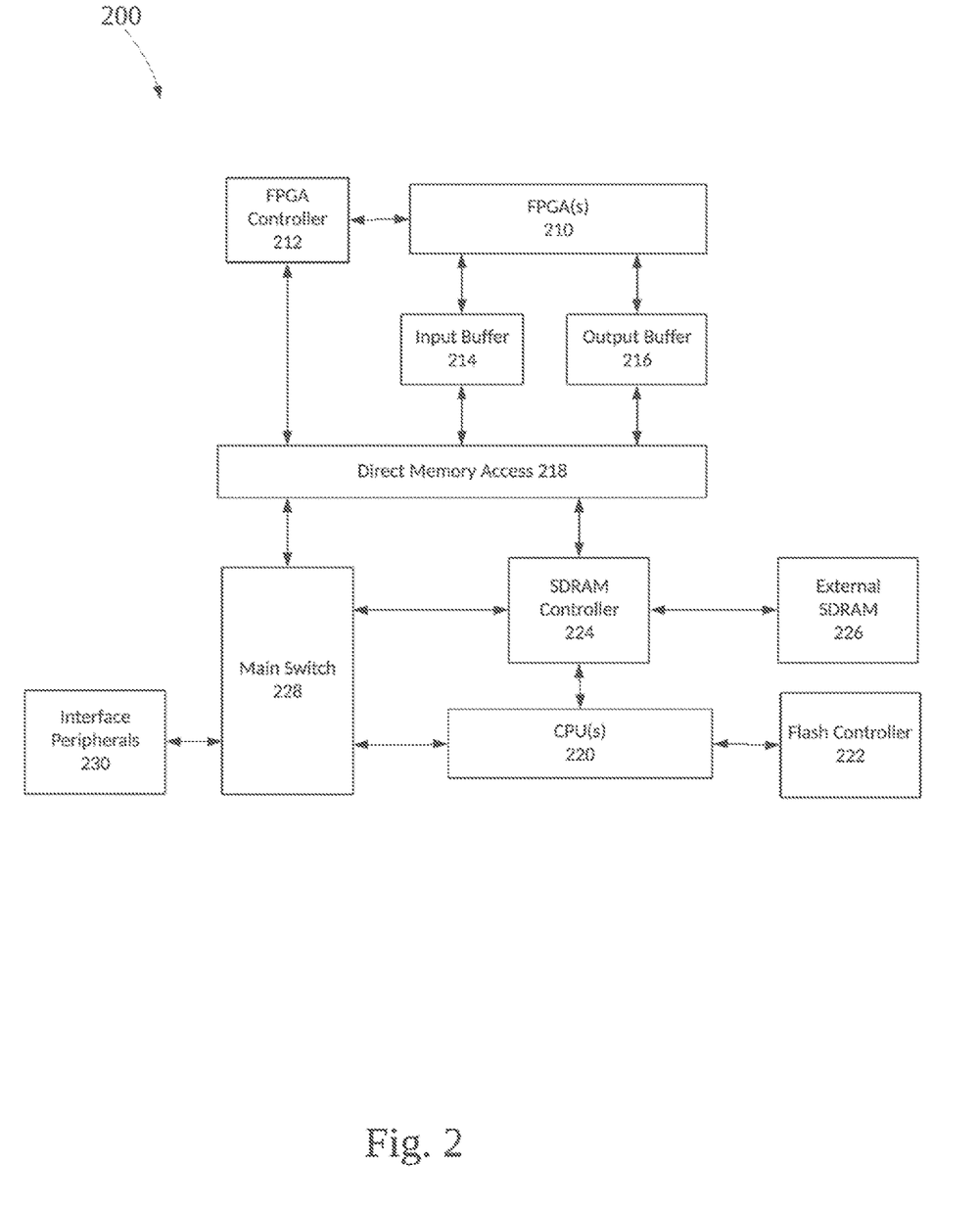
FIG. 2 is a second example system diagram in accordance with one embodiment of the disclosure.

FIG. 2 depicts a second example hybrid computational system 200 that may be used to implement neural nets associated with the operation of one or more portions or steps of process 1000. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host. CPU and the other for the FPGA, the DMA allows data to be written to and read from the appropriate buffer.

On the CPU side of the DMA are a main switch 228 which shuttles data and commands to the DMA The DMA is also connected to an synchronous dynamic random access memory (SDRAM) controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

A possible solution to deep visual odometry (VO), visual simultaneous localization and mapping (\ISLAM) may be constructed utilizing a convolutional neural network (CNN)—long term short term memory (LSTM) framework. In one example solution a CNN architecture combining a depth network, a flow network, a segmentation network and a feature network may be utilized. In the LSTM architecture, a two layer LSTM with an attention mechanism and multi-stage training, is designed to mimic key frame selection, local/global pose graph optimization and loop closure. An attention mechanism selectively concentrates on a few relevant items, while ignoring others, it allows the decoder to decide which parts of the source sentence to pay attention to.

Feature extraction, disparity/depth estimation, optic flow estimation and pose estimation are currently utilized in visual odometry (VO) or visual simultaneous localization and mapping (VSLAM) frameworks. VO or VSLAM methods are classified as direct and indirect, where the former estimate the pose directly from images, and the latter extracts features and computes pose from 2D feature matchings or 2D feature-3D reconstructed feature matchings. VO or VSLAM platform currently consist of a fronted and a backend, in which the frontend determines the poses and adds newly reconstructed scenes in the map and the backend optimizes the group of poses as well as the map in a nonlinear optimization framework. The key frame structure may be applied in VO or VSLAM to increase the efficiency of the frontend and backend.

One example solution provides a pose network that is jointly trained with optic flow network, depth network, segmentation network and feature network for visual odometry and visual simultaneous localization and mapping.

Figure 3:
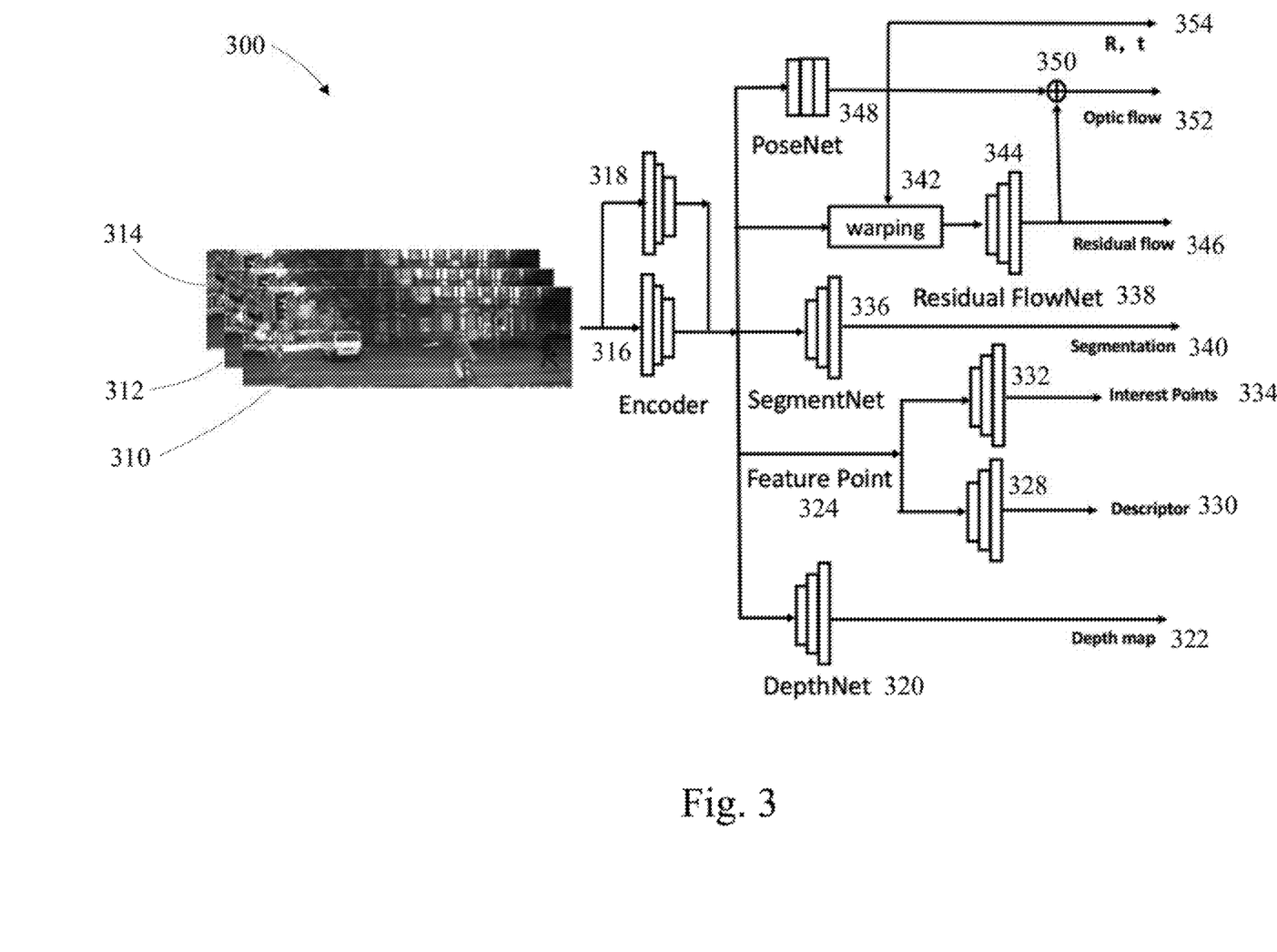
FIG. 3 is an example joint training framework of learning pose, feature, depth, flow and segmentation in accordance with one embodiment of the disclosure.

In one example solution a framework of multi-task learning in deep VO or VLSAM involves a feature network, a depth network, a flow network, a semantic segmentation network and a pose network, shown in FIG. 3.

FIG. 3 depicts an example joint training network that includes at least two joint training encoders 316, 318 receiving a plurality of frames 310, 312, 314 and outputting a network input. A feature network 324 is coupled to the network input and including a feature detector decoder 332 outputting interest points 334 and a descriptor generator decoder 328 outputting descriptors 330, the feature detector decoder 332 and the descriptor generator decoder 332 are coupled in parallel. A depth network is coupled to the network input and including a monocular depth prediction decoder 320 and outputting a depth map 322. A flow network coupled to the network input and including an image segmentation decoder 336 and outputting a segmented image 340. A segmentation network 344 coupled to the network input and including a warping module 342 outputting 354 a rotation and translation and an input warp signal to a segmentation decoder outputting a residual flow 346. A pose network coupled to the network input and including a fully connected pose estimator 348 coupled to an adder 350 that receives input from the pose estimator and the residual flow 346 from the segmentation decoder, the adder outputting an optical flow 352. The monocular depth prediction may be performed by DepthNet the image segmentation may be performed by SegmentNet, the pose estimator may be performed by PoseNet and the flow network may be FlowNet.

A feature is an individual measurable property of an object in an image. A feature vector is an n-dimensional vector of numerical features that represent that object. A feature network is a convolutional neural network that recognizes features of the object and describes it as the n-dimensional vector. A feature network may include a feature detector decoder outputting interest points and a descriptor generator decoder outputting descriptors.

DepthNet is a convolutional long short-term memory (LSTM) network architecture for depth prediction from a monocular video sequence. Long short-term memory recurrent neural networks (RNNs) learn to reason sequentially and predict the depth map for an image frame base on the appearances of objects in a current image frame and image frames that are close in time to the current image. A depth network may include a monocular depth, prediction decoder.

Optical flow estimation utilizes per-pixel localization and finds correspondences between two input images. This involves learning image feature representations and learning to match them at different locations in the two images. FlowNet is a convolutional neural network that directly predicts optical flow from two input images. In FlowNet the information is spatially compressed and then refined. A flow network may include an image segmentation decoder.

SegmentNet is a convolution-deconvolution convolutional neural network that produces a segmented image. SegmentNet removes background information using a convolutional neural network for semantic segmentation and creating an object mask image. A semantic segmentation network may include a warping module outputting a rotation and translation and an input warp signal to a semantic decoder outputting a residual flow.

PoseNet is a convolutional neural network to regress the six degree of freedom camera pose from a single image. PoseNet labels data using structure from motion to generate regression datasets of camera pose and transfers learning to train a pose regressor, pre-trained as a classifier based on image recognition datasets. A pose network may include a fully connected pose estimator coupled to an adder that receives input from the pose estimator and the residual flow from the semantic decoder.

In FIG. 3, the input is the monocular image from the camera, where the pose network and the flow network input two images and the other networks input one image. The networks share encoders to extract hierarchical feature maps, the decoders or regression layers are coupled to different outputs.

The feature network is targeted for feature detection and description generation. Two different decoders are shown, one for feature detection and localization and one for description generation, to other example networks a single decoder may, be utilized for both tasks. Feature matching is done by a feature descriptor's similarity, such as k-NN. Matched points may be utilized in the loss function of the pose network.

The segmentation network may generate pixel-wise scene parsing, wherein some objects are suggested for removal front pose network's loss function, such as the sky, water-like objects, trees, mirrored surfaces, vehicles, pedestrians and the like. A road surface and static objects in a street or highway, may be removed from the loss function of residual now estimation. Similarly, extracted features may be classified based on semantic segmentation and contribute to the loss function correspondingly.

The depth network may infer a pixel depth from a single image instead of stereo images, Depth consistency may be defined in the loss function with contribution from the segmentation and the optic flow. An optic flow network may estimate the residual flow based on camera motion estimated from pose network. Depth may contain structural constraints used for loss determination in the flow network and the pose network. The optic flow and the pose estimation may be cross checked to include consistency constraints, such as forward and backward warping.

The pose network in this joint training platform generates the output, i.e. rotation R and translation t, for VO or VSLAM.

Unsupervised learning loss function may be defined to include the image appearance loss term based on a view synthesis by depth, camera pose and residual flow, a smoothness loss term based on edge-aware image and geometry-aware depth smoothness, as well as a consistency loss term for the camera pose that may include rotation and translation, segmentation, residual optic flow and the like.

Segmentation labels may be implicitly applied in the guided loss function as a weight or a mask, features may be applied with a segmentation mask or a segmentation weight for the loss part including a pose or flow contribution.

A key frame pool may be constructed by adding or deleting key frames to avoid redundancy.

Figure 4:
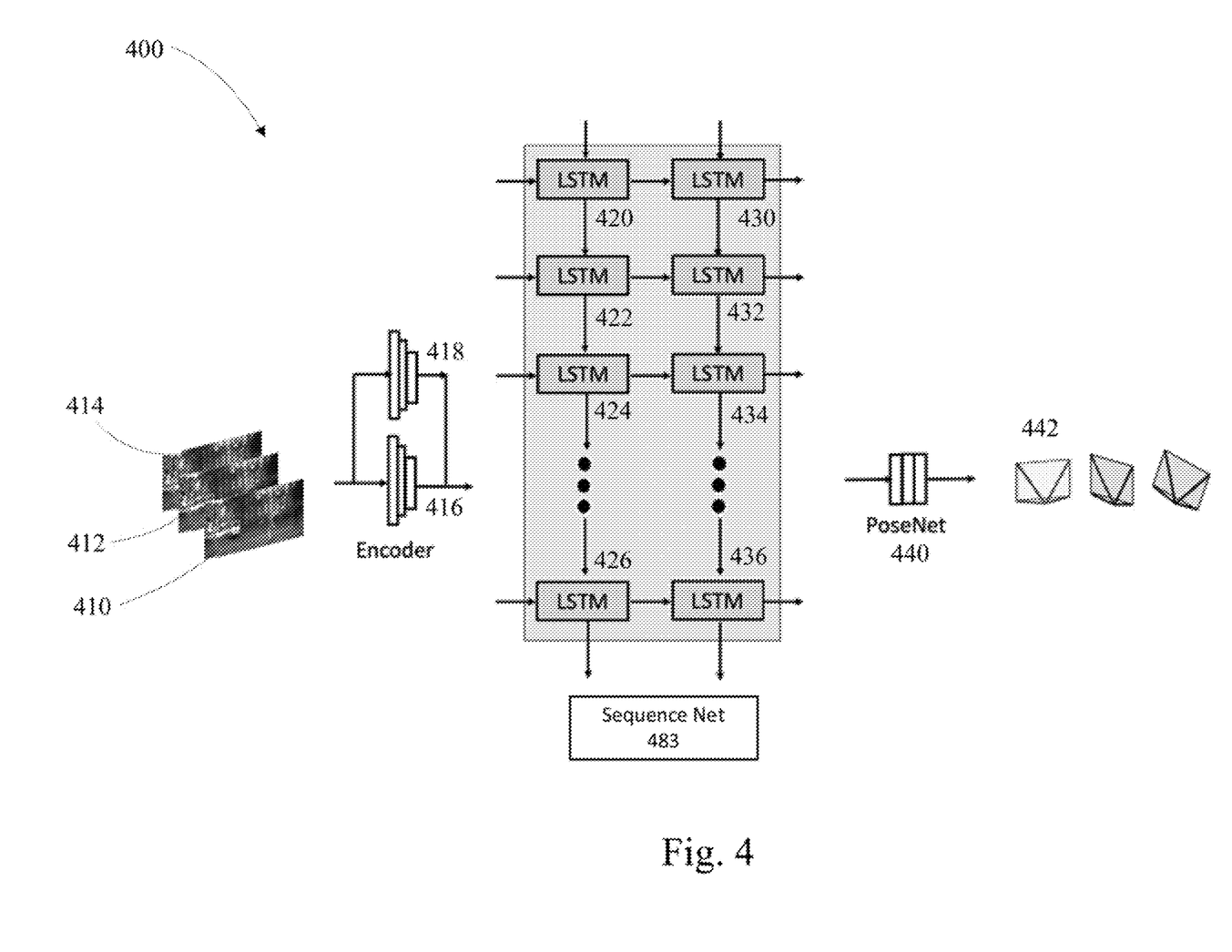
FIG. 4 is an example deep learning visual odometry or visual simultaneous localization and mapping platform with long term short term memory in accordance with one embodiment of the disclosure.

FIG. 4 depicts a recurrent neural network including long-term short-term memory and an attention mechanism based deep VO. VSLAM system. FIG. 4 depicts an example two layered long term short term memory (LSTM) to determine a camera pose. The example includes at least two joint training encoders 416, 418 receiving a plurality of frames 410, 412, 414 and outputting the network input. A first set of LSTMs 420-426 are connected to the output of the joint training encoders. The second set of LSTMs 430-436 are connected to the output of the first set of LSTMs 420-426. The output of the second set of LSTMs 430-436 are connected to a fully connected pose network 440 and outputs a camera pose 442. The first long term short term memory may learn key frame classification selection based on pose transition and windowed profile guided optimization and the second long term short term memory may learn pose dynamics and refine a global pose based upon profile guided optimization with loop closure.

FIG. 4 depicts an example two-layered LSTM network to estimate the camera pose from the input from a convolutional neural network encoder. The first layer LSTM may perform learning the short time pose transition for key frame selection and windowed profile-guided optimization and the second layer may perform learning long time pose dynamics and refining the global pose utilizing profile-guided optimization with loop closure.

Figure 5:
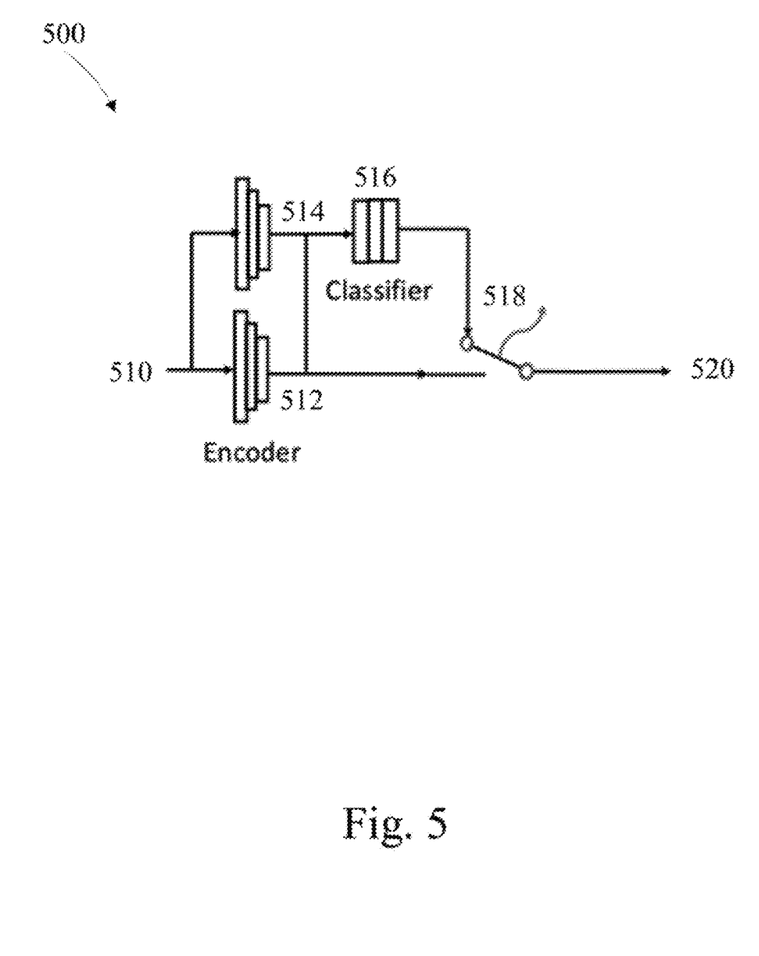
FIG. 5 is an example key frame classifier model in accordance with one embodiment of the disclosure.

FIG. 5 depicts an example key frame classifier module that includes a first key frame encoder 512 having a first key frame encoder input receiving the plurality of frames 510 and a first key frame encoder output. A second key frame encoder 514 includes a second key frame encoder input coupled to the first key frame encoder input and receiving the plurality of frames. A second key frame encoder output is coupled in parallel to the first key frame encoder output, the second key frame encoder output is coupled to a fully connected classifier layer 516 outputting a classified output. A key frame select switch 518 coupled to the first key frame encoder output and the classified output, wherein the switch classifies a possible key frame 520 of the plurality of frames as a key frame if a difference between a previous key frame and the possible key frame is larger than a predetermined threshold. A key frame detection module receives the first key frame encoder output and selects the key frame based on a difference between the first key frame encoder output and at least one of the first feature output and the second feature output.

The first layer's output may be filtered to remove redundancy by a key frame detection model, which is trained to select in switch like fashion, key frames based on the encoder's output, as shown in FIG. 5. Rotation and translation may be discarded in the pose network for key frame estimation in lieu of measuring the feature map difference from the encoder. Initially, the current frame may be compared with the previous frame; if the difference is larger than a predetermined data to the reference frame, the key frame may be shifted to the current frame; if not, the reference frame may remain unchanged, and the current frame may be indexed to the next frame.

Figure 6:
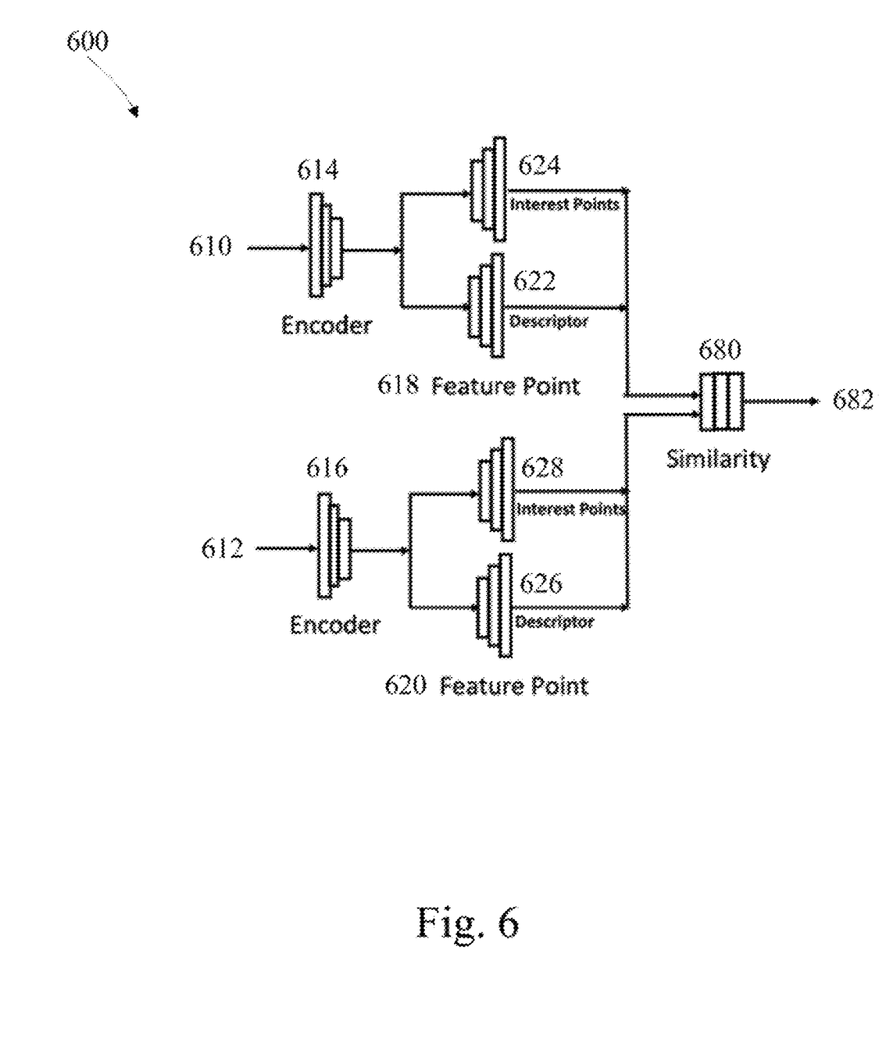
FIG. 6 is an example attention-based model for loop closure in accordance with one embodiment of the disclosure.

FIG. 6 depicts an example loop closure module including a first loop closure encoder 614 receiving an input 610 and coupled to a first feature detector decoder 624 outputting a first interest point and a first descriptor generator decoder 622 outputting first descriptors. the first feature detector decoder and the first descriptor generator decoder are coupled in parallel and output a first feature output. A second loop closure encoder 616 receiving an input 612 and coupled to a second feature detector decoder 628 outputting a second interest point and a second descriptor generator decoder 626 outputting second descriptors. The second feature detector decoder and the second descriptor generator decoder are coupled in parallel and output a second feature output. A fully connected similarity layer 680 receives the first feature output and the second feature output and outputs a similarity 682.

The second layer LSTM may be designed to emulate a global pose optimization with a loop closure mechanism. A loop closure mechanism model may be mimicked by a transformer-like self-attention mechanism, in which similarity is measured by the feature network output as shown in FIG. 6.

The global/absolute pose estimation may be calculated in the second layer LSTM by accumulating the predicted related poses from the first layer LSTM.

Loop closure is defined utilizing the similarity in the attention mechanism to measure whether loop closure is obtained. The features may be defined explicitly via the feature network. The attention may be a spatial-temporal based attention mechanism, instead of the current temporal based attention mechanism.

Figure 7:
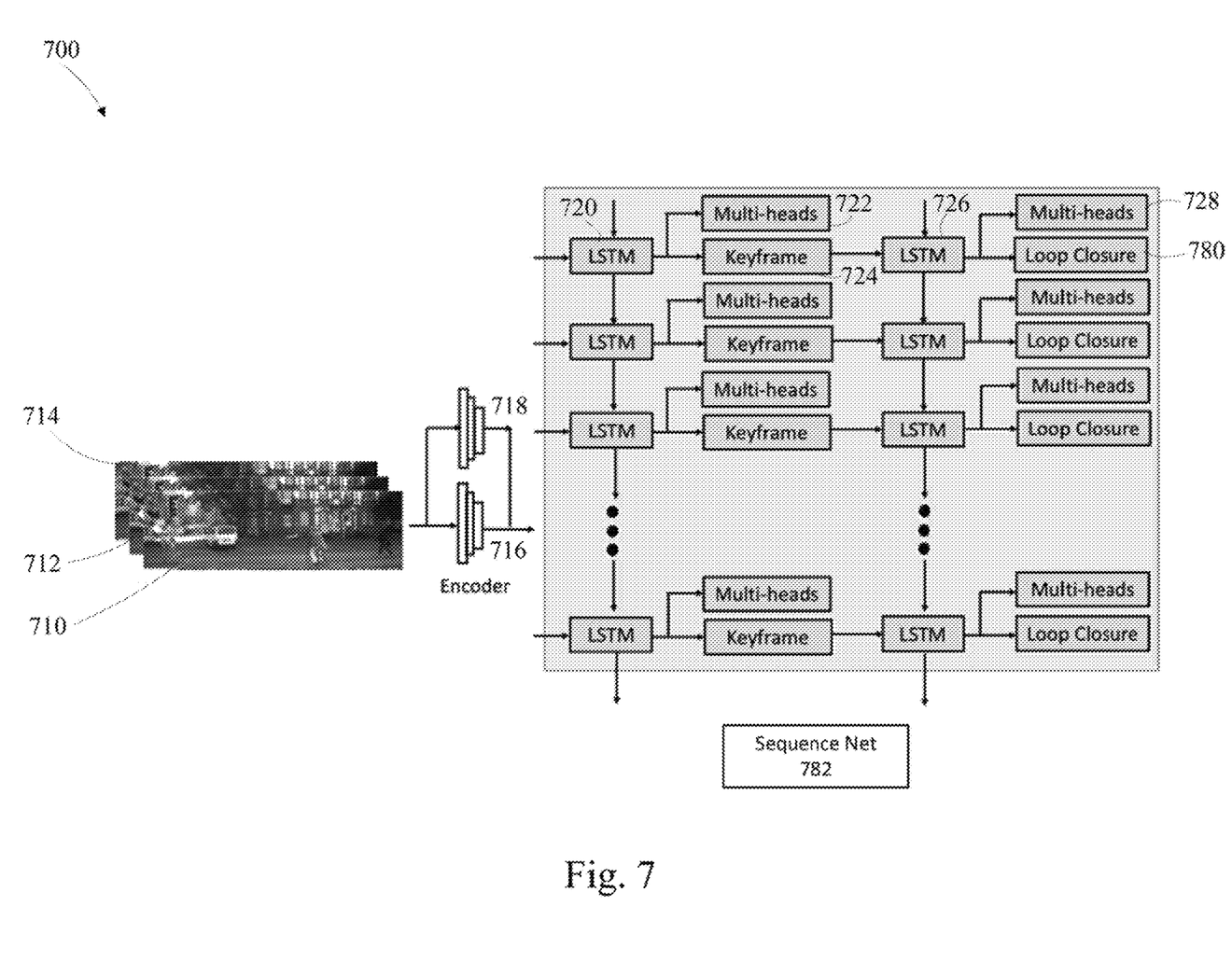
FIG. 7 is an example joint training framework of learning pose, feature, depth, flow and segmentation with long term short term memory in accordance with one embodiment of the disclosure.

FIG. 7 depicts an example joint training framework that includes least two joint training encoders 716, 718 receiving a plurality of frames 710, 712, 714 and outputting the network input. A first long term short term memory 720 (LSTM) is coupled in parallel to a first multi-head module 722 and the key frame classifier module 724. A second long term short term memory 726 is coupled to an output of the key frame classifier module 724 and coupled in parallel to a second multi-head module 728 and the loop closure module 780. The second long term short term memory 726 estimates global pose by accumulating a set of predicted related poses from the first long term short term memory 720.

The encoder-LSTM network may be trained simultaneously with the flow network, the segmentation network, the feature network, the depth network, the two layered LSTM, key frame classifier and the attention-based loop closure mechanism as shown in FIG. 7.

Figure 8:
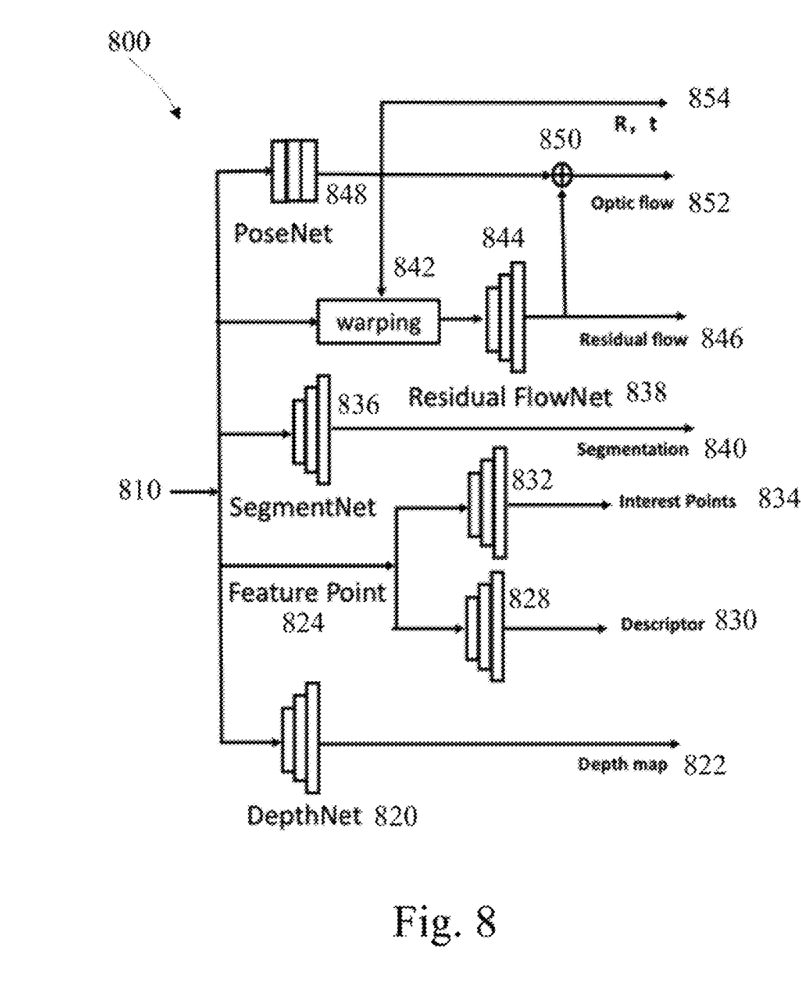
FIG. 8 is an example multi-head module architecture in accordance with one embodiment of the disclosure.

The multi-heads module is shown in FIG. 8, which may bear similarity to FIG. 1. The training process may be performed in multiple stages. The first stage may be processed for the CNN encoder framework as shown in FIG. 1. The second stage may be processed for the CNN encoder in the first layer LSTM framework. The third stage may be processed for the CNN encoder in the two layered LSTM framework, FIG. 8 depicts a multi-head module that includes a network input 810. A feature network 824 is coupled to the network input 810 and including a feature detector decoder 832 outputting interest points 834 and a descriptor generator decoder 828 outputting descriptors 830, the feature detector decoder 832 and the descriptor generator decoder 828 are coupled in parallel, A depth network is coupled to the network input 810 and including a monocular depth prediction decoder 820 and outputting a depth map 822. A flow network coupled to the network input 810 and including an image segmentation decoder 836 and outputting a segmented image 840. A segmentation network 844 coupled to the network input 810 and including a warping module 842 outputting 854 a rotation and translation and an input warp signal to a segmentation decoder outputting a residual flow 846, A pose network coupled to the network input 810 and including a fully connected pose estimator 848 coupled to an adder 850 that receives input from the pose estimator and the residual flow 846 from the segmentation decoder, the adder outputting an optical flow 852. The monocular depth prediction may be performed by DepthNet, the image segmentation may be performed by SegmentNet, the pose estimator may be performed by PoseNet and the flow network may be FlowNet.

A first stage may be processed to train the at least two joint training encoders, a second stage may train the at least two joint training encoders, the first long term short: term memory, the multi-head module and the key frame classifier module. A third stage may be processed to train the at least two joint training encoders, the second long term short term memory, a second stage multi-head module, a second stage key frame classifier module and the loop closure module.

In one example of the proposed CNN architecture, the depth network, the flow network, the segmentation network and the feature network are jointly trained. In the LSTM architecture, a two layered LSTM with attention mechanism and multi-stage-training performs key frame selection, local/global pose graph optimization and loop closure.

Those of skill in the art would appreciate that the various illustrative blocks, modules, elements, components, methods, and algorithms described herein may be implemented as electronic hardware, computer software, or combinations of both, To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the system. Skilled artisans may implement the described functionality in varying ways for each particular application. Various components and blocks may be arranged differently (e.g., arranged in a different order, or partitioned in a different way) without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and axe not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects may be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an aspect does not imply that such aspect is essential to the subject technology or that such aspect applies to configurations of the subject technology. A disclosure relating to an aspect may apply to configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to configurations of the subject technology. A disclosure relating to an embodiment may apply to embodiments, or one or more embodiments, An embodiment may provide one or more examples. A phrase such as an "embodiment" may refer to one or more embodiments and vice versa. A phrase such as a "configuration" does not imply that such configuration is essential to the subject technology or that such configuration applies to configurations of the subject technology. A disclosure relating, to a configuration may apply to configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

Structural and functional equivalents to the elements of the various aspects described throughout this disclosure that are known or later come to be known to those of ordinary skill in the art are expressly incorporated herein by, reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have." or the like is used in the description or the claims, such term is intended to be inclusive in a manner similar to the term "comprise" as "comprise" is to interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment, tat conjunction with the present disclosure, those skilled in the art may be able to design and incorporate any one of the variety of mechanisms suitable for accomplishing the above described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A joint training network, comprising:
   a multi-head module comprising:
   a network input;
   a feature network coupled to the network input and including a feature detector decoder outputting interest points and a descriptor generator decoder outputting descriptors, the feature detector decoder and the descriptor generator decoder coupled in parallel;
   a depth network coupled to the network input and including a monocular depth prediction decoder and outputting a depth map;
   a flow network coupled to the network input and including an image segmentation decoder and outputting a segmented image;
   a segmentation network coupled to the network input and including a warping module outputting a rotation and translation and an input warp signal to a segmentation decoder outputting a residual flow;
   a pose network coupled to the network input and including a fully connected pose estimator coupled to an adder that receives input from the pose estimator and the residual flow from the segmentation decoder, the adder outputting an optical flow; and
   a key frame classifier module comprising:
   a first key frame encoder having a first key frame encoder input receiving the plurality of frames and a first key frame encoder output;
   a second key frame encoder having a second key frame encoder input coupled to the first key frame encoder input and receiving the plurality of frames, a second key frame encoder output coupled in parallel to the first key frame encoder output, the second key frame encoder output coupled to a fully connected classifier layer outputting a classified output; and
   a key frame select switch coupled to the first key frame encoder output and the classified output, wherein the switch classifies a possible key frame of the plurality of frames as a key frame if a difference between a previous key frame and the possible key frame is larger than a predetermined threshold.

2. The joint training network of claim 1, wherein the network input is from a monocular camera.

3. The joint training network of claim 1, further comprising at least two joint training encoders receiving a plurality of frames and outputting the network input.

4. The joint training network of claim 3, further comprising:
   a loop closure module comprising:
   a first loop closure encoder coupled to a first feature detector decoder outputting a first interest point and a first descriptor generator decoder outputting first descriptors, the first feature detector decoder and the first descriptor generator decoder coupled in parallel and outputting a first feature output;
   a second loop closure encoder coupled to a second feature detector decoder outputting a second interest point and a second descriptor generator decoder outputting second descriptors, the second feature detector decoder and the second descriptor generator decoder coupled in parallel and outputting a second feature output; and
   a fully connected similarity layer receiving the first feature output and the second feature output and outputting a similarity.

5. The joint training network of claim 1, further comprising:
   a first long term short term memory (LSTM) coupled in parallel to a first multi-head module and the key frame classifier module; and
   a second long term short term memory coupled to an output of the key frame classifier module and coupled in parallel to a second multi-head module and the loop closure module.

6. The joint training network of claim 5, wherein a first stage trains the at least two joint training encoders, a second stage trains the at least two joint training encoders, the first long term short term memory, the multi-head module and the key frame classifier module and a third stage trains the at least two joint training encoders, the second long term short term memory, a second stage multi-head module, a second stage key frame classifier module and the loop closure module.

7. The joint training network of claim 5, wherein the first long term short term memory learns key frame classification selection based on pose transition and windowed profile guided optimization and the second long term short term memory learns pose dynamics and refine a global pose based upon profile guided optimization with loop closure.

8. The joint training network of claim 5, further comprising a key frame detection module that receives the first key frame encoder output and selects the key frame based on a difference between the first key frame encoder output and at least one of the first feature output and the second feature output.

9. The joint training network of claim 5, wherein the second long term short term memory estimates a global pose by accumulating a set of predicted related poses from the first long term short term memory.

10. The joint training network of claim 5, wherein the monocular depth prediction is performed by depthnet.

11. The joint training network of claim 5, wherein the image segmentation is performed by segmentnet.

12. The joint training network of claim 5, wherein the pose estimator is performed by posenet.

13. The joint training network of claim 5, wherein the flow network is flownet.

\* \* \* \* \*